H. C. MILLER.

AUTOMATIC STOPPING DEVICE FOR SOUND REPRODUCING MACHINES.

APPLICATION FILED OCT. 20, 1915.

Reissued Feb. 6, 1917.

14,257.

2 SHEETS—SHEET 1.

Inventor

Henry C. Miller.

Witnesses

F. J. Hartnett.

John D. Myers.

By Fritter & Blount.

Attorneys

H. C. MILLER.

AUTOMATIC STOPPING DEVICE FOR SOUND REPRODUCING MACHINES.

APPLICATION FILED OCT. 20, 1915.

Reissued Feb. 6, 1917. 14,257.

2 SHEETS—SHEET 2.

Witnesses

W. J. Hartman.

John D. Myers.

Inventor

Henry C. Miller.

By Fritow & Blount

Attorneys

REISSUED

UNITED STATES PATENT OFFICE.

HENRY C. MILLER, OF WATERFORD, NEW YORK, ASSIGNOR TO VICTOR TALKING MACHINE COMPANY, OF CAMDEN, NEW JERSEY, A CORPORATION OF NEW JERSEY.

AUTOMATIC STOPPING DEVICE FOR SOUND REPRODUCING MACHINES.

14,257. Specification of Reissued Letters Patent. Reissued Feb. 6, 1917.

Original No. 1,076,385, dated October 21, 1913, Serial No. 321,014, filed June 9, 1906. Application for reissue filed October 20, 1915. Serial No. 57,003.

*To all whom it may concern:*

Be it known that I, HENRY C. MILLER, a citizen of the United States, residing at Waterford, in the county of Saratoga and State of New York, have invented certain new and useful Improvements in Automatic Stopping Devices for Sound-Reproducing Machines, of which the following is a specification.

This invention relates to an improved automatic stopping device for use in connection with talking machines.

According to my invention I provide means to actuate a brake device adapted to stop the rotation of a record-supporting device, at the termination of the operative travel of the sound box and its stylus over the grooves of the record, such brake-actuating means being brought into operation directly by the conjoint action of the record and the automatic movement thereover of the sound box and stylus and its tone-carrying arm.

To these ends my invention consists in its entirety of the combination with a brake device actuated by a spring mechanism which maintains it normally in contact with the periphery of a rotatable sound record support, as usual, of a movable catch device that may be set to tension the brake-spring and maintain the brake normally out of contact with the record, a pivoted latch provided with means to cause it to move into engagement with the catch element, connecting means pivoted at one of its terminals to said latch, and a lever hinged to the other end of said connecting means and operating to rock the latch on its pivot, and a member brought into operative relation to said lever on the completion of the operative movement of the tone arm carrying the sound box over the sound grooves of the record. My invention in the embodiment thereof illustrated in the drawings also includes specific means to actuate the hinged lever through the operative movement of the tone arm, said means comprising means on the record itself actuating a rod caused to contact with said hinged lever on the completion of the operative movement of the stylus relative to the sound record grooves; but the essential features of the brake-actuating mechanism, forming a novel subcombination of my invention, reside in the combined tripping means stated, irrespective of the specific means to operate the hinged lever on the completion of the operative movement of the tone arm and sound box over the record grooves.

In the drawings—

The same numerals refer to like parts in all the figures.

Figure 2:
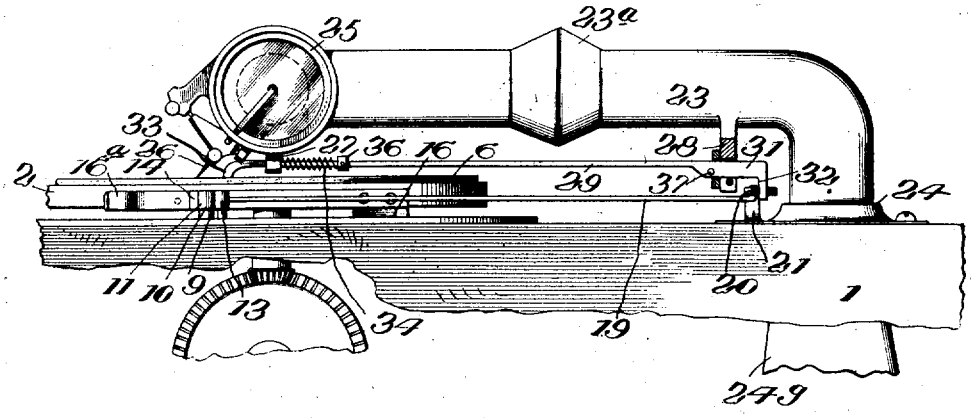
Fig. 2 is a side elevation of the same.

1, indicates a talking machine, of the disk type, but it is to be understood the invention is not limited to machines having this characteristic, as it will operate equally well in connection with cylinder records. The numeral 2 indicates a turntable provided with a central spindle 3, having preferably three splines to coöperate with notches 4, communicating with the centrally disposed opening 5, of a disk record 6. In the specific form shown in the drawings for actuating the brake-controlling mechanism, I can utilize the record, having the usual spiral and laterally-undulating sound grooves 7 as the sole initial actuating member for operating the brake-controlling device, and this is effected by providing a small opening 8 therein, adjacent the inner end of the sound grooves and preferably spaced therefrom, or its equivalent contacting lug $8^a$ on the face of the record in the same location.

9, represents a stud on the motor board of the talking machine, or may be a post on the frame of the motor, but as the motor has nothing to do with my present invention I have not deemed it necessary to illustrate or describe it. Mounted on the stud 9, is a latch 10, having a finger operating end 11, and a notch 12, at the opposite end, a spring 13, normally exerting pressure against said latch to force the notched side into a catch 14. The catch 14, is mounted on a spring actuated brake member 15, secured to the frame of the machine at 16, and bent out at one end to form a finger grip 16[a]. On one face of the member 15, is a leather shoe 18, adapted to bear on the periphery of the turntable 2 when the member 15 is released from the latch.

Connected to the notched end of the latch 10, is a rod 19, pivotally attached at its opposite end to a lever 20, mounted on a post 21, but it is to be understood that any other suitable operative connection between said latch and said lever may be employed. The free end 22, of the lever 20, extends somewhat beyond the post 21, to coöperate with the means for tripping the brake.

In the aforesaid specific form of tripping member shown in the drawings for actuating the brake-controlling mechanism, a rod 29 is employed, carried by the tone arm or sound box carrying arm 23, mounted to turn horizontally on a coupling, indicated at 24. On the outer end of the sound conveyer is attached the usual sound box 25, having a stylus 26. Two bearings 27, and 28, support the tripping member 29, which, as shown, extends longitudinally of the conveyer and has a slight lateral movement in its bearings toward and from the record disk, as well as a slight movement in direction of the record face, and longitudinal movement for operating the automatic brake. The tripping member therefore is mounted independent of the stylus, and does not interfere with the movement of the latter. The rear end 31, of the tripping member is enlarged to provide a substantial bearing, and is turned down to form a depending finger 32, which is located behind and in close proximity to the free end of the lever 20, but is not connected thereto. The front free end of the tripping member has attached to it a downwardly inclined or beveled rubber tip 33, adapted to coöperate with the opening 8, or a lug if one be employed. The tripping member is normally forced toward the rear of the machine by a spring 34, confined between the collar 36 thereon, and bearing 27, the movement of the tripping member toward the rear being limited by a stop 37.

To start the machine, the finger grip 16[a], of brake member 15, is drawn away from the periphery of turntable 2, which frees the motor. The catch 14, catches in the notch 12, and the spring brake member is held away from turntable 2. This permits the latch 10, to turn slightly which, through the connection 19, moves the free end 22 of lever 20, toward the depending finger 32, of the tripping member 29. As the stylus follows the spiral groove in the record, the rubber tip likewise travels the same course, but in advance of the stylus. The rubber tip is supported on the record, but because of its being of resilient material it does not mar or destroy the groove. The tipped end of the tripping member being to one side of and spaced from the stylus it necessarily follows that it will leave the zone of the record groove first. This relationship of parts is preferable to enable me to locate the opening 8 some distance from the end of said record groove.

When the stylus reaches the end of the sound record groove, the tipped end 33, of the tripping member 29, drops into opening 8, and is drawn forwardly thereby. The finger 32, engaging lever 20, rocks it, and through connection 19, the notch 12, is disengaged from the catch 14, and the spring brake member 15, springs toward the turntable and stops the motor. When the rear edge of opening 8, engages the tipped end 33, and pulls it forward, spring 34, is compressed, but the parts are so arranged that before the shoe 18, finally brings the motor to a standstill, the pull on the beveled end of the tip will cause the latter to rebound or become disengaged; and the spring 34 will return it to normal position. The spring 34, therefore tends to act as a retarder, as it causes a pull on the motor, before the shoe finally stops the machine. Furthermore, by the particular construction and arrangement of parts the motor is stopped without jarring the mechanism as would be the case if the tripping member were held fast when the brake shoe is applied.

By the use of this invention it is not necessary for an operator to be positioned adjacent a machine, as the attachment will automatically stop the motor, after the selection has been produced. To restore the stylus to its normal position, or for the insertion of another record, the sound conveyer is raised in the usual manner and turned toward the right, as will be understood.

Figure 1:
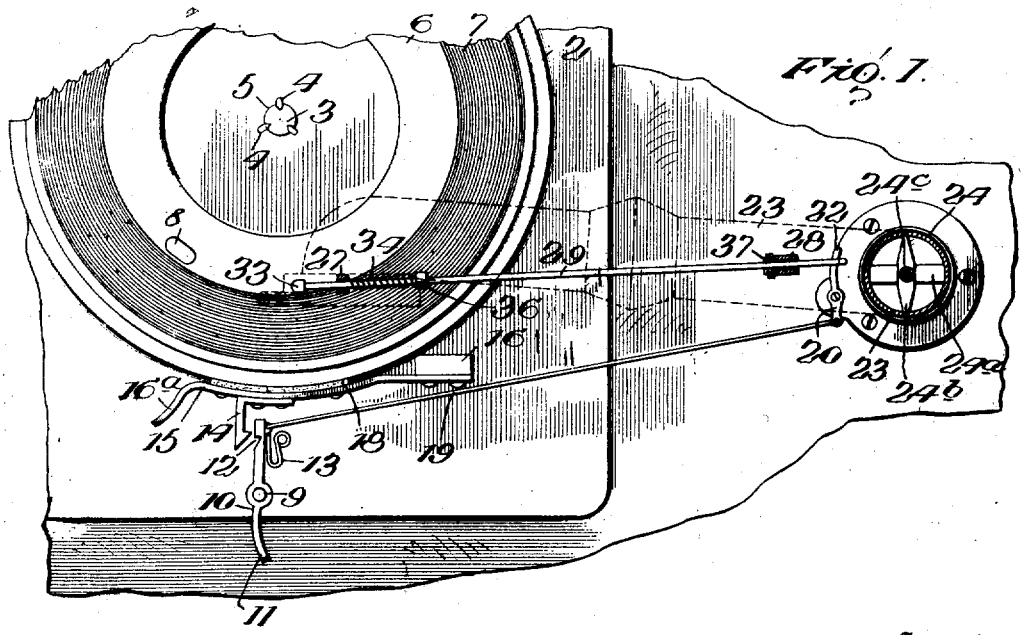
Figure 1 is a plan view of a portion of a talking machine, showing my improvement applied thereto.
Figure 3:
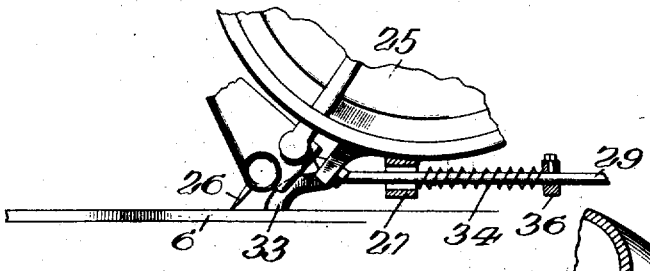
Fig. 3 is an enlarged detail view of one end of the tripping member.
Figure 4:
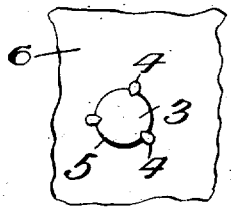
Fig. 4 is an enlarged detail view of the means I employ for holding the record on the turn table.
Figure 7:
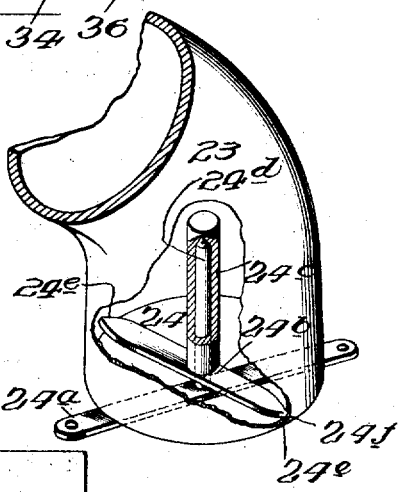
Fig. 7 is a detail view of a coupling I employ between the sound conveyer and the horn.
Figure 5:
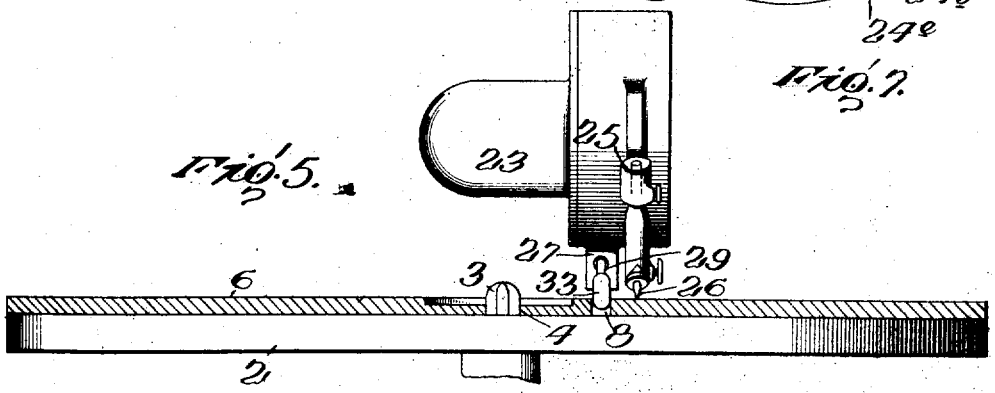
Fig. 5 is an end elevation.
Figure 6:
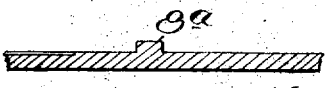
Fig. 6 is a detail view of a record having a lug, instead of an opening to operate the automatic stopping mechanism.

The sound conveyer 23, is formed intermediate the sound box, and the coupling 24, with a truncated enlargement 23[a], as shown in Fig. 1, to augment the sound. The coupling 24, comprises a support 24[a], secured at its ends to a fixed part of the machine, and a conveyer support 24[b], has a centrally disposed bearing 24[c], to receive a post 24[d], on support 24[a], and laterally disposed journals 24[e], having bearings at 24[f], in the sides of the sound conveyer. By this construction the sound conveyer is coupled to a horn 24[g], and may be raised or lowered, or turned horizontally over the record.

What I claim is:—

1. In a talking machine comprising a rotatable record support, a spring-actuated brake adapted to engage the record support, a sound box having a stylus, a sound box carrying-arm having movement over the record, and a record having sound grooves adapted to automatically propel the stylus over the same by contact, the combination therewith of a movable catch device adapted to be set to tension the brake-spring and maintain the brake normally out of contact with the record, a pivoted latch provided with means to cause it to move into engagement with the catch element, connecting means pivoted at one of its terminals to said latch, a lever hinged to the other end of said connecting means and operating to rock the latch on its pivot, and a member brought into operative relation to said lever on the completion of the operative movement of the arm carrying the sound box over the sound grooves of the record.

2. In a sound reproducing machine, the combination with a rotatable record support, a brake therefor, a record provided with trip operating means, a movable tripping member adapted to be operated by the operating means on the record, means between the tripping member and the brake for releasing the latter, and automatic means for returning the tripping member to normal position after the brake has been released.

3. In a sound reproducing machine, the combination with a rotatable record support, a spirally grooved record, a sound box and stylus adapted to be automatically propelled across the same by said grooves, and sound box supporting means adapted to have a free swinging movement over the record, of a spring-controlled brake device, a catch device adapted to be set to counteract the brake spring, a pivoted latch, a rocking lever, connecting means between said latch and lever, and a tripping member adapted to be brought into operative relation to said lever.

4. In a sound reproducing machine, the combination of a sound box, a rotatable record support, a brake to stop the record support at a predetermined point in its movement, a tripping member movable with the sound box, means for operating the tripping member, and means between the tripping member and the brake for operating the latter, said means being separated from but in the path of movement of the tripping member.

5. In a sound reproducing machine, the combination of a rotatable record support, a brake therefor, a record having a trip-engaging part, a tripping member coöperating therewith, a lever adapted to be engaged by the tripping member, a catch device operating normally to hold the brake in inoperative position, a pivoted spring actuated latch, and connecting means between said lever and the latch.

6. In a sound reproducing machine, the combination of a sound box, a record support, and brake mechanism for stopping the movement of the record support at a determinate point, said brake mechanism comprising a tripping member mounted to move with the sound box, a brake having a catch, a pivoted latch, a pivoted lever with which the tripping member coöperates, and a connection between the pivoted lever and the latch.

7. The combination with a sound reproducing machine, of a cut-off comprising brake mechanism, means for releasing the same which in part moves with the reproducer of the machine, mechanical means mounted to move with the rotatable record support of the machine for operating directly on said releasing means, and means for automatically returning to normal position the part of the releasing means movable with the reproducer.

8. The combination with a sound reproducing machine comprising a movable supporting arm, and a sound box carried thereby, and a rotatable record support, of a cut-off therefor comprising a brake, means for normally holding the brake in operative position, a catch device and a coöperating latch for holding the brake in inoperative position, tripping means for the latch mounted to move with the sound box and with the movable arm supporting the same, and means brought into operative position by the rotation of the record, for engaging the tripping means to actuate it and release the latch.

9. A talking machine comprising a rotating record support, a reproducer movable relatively thereto, a brake for said support, means for normally holding said brake in braking position, a latch for holding said brake in inoperative position, tripping means for the latch mounted to move with the reproducer, and means carried by the rotating record support for engaging the tripping means to move said tripping means and thereby release the latch.

10. The combination with a talking machine including a movable arm and a record formed with a depression, of a trip mechanism movably carried by the movable arm of the machine and including a body designed to engage the depression in the record, a rod actuated in the movement of the body under the influence of the record, and a brake mechanism automatically actuated by said rod.

11. In a talking machine, the combination with a movable record, a sound reproducing device adapted to move over said record, a stop for controlling the movement of said record, and a stop-controlling member, of positively actuated means permanently connected to said stop-controlling member and controlled by the movement of said sound-reproducing device for actuating said stop-controlling member.

12. In a talking machine, the combination with a movable record, a sound-reproducing device adapted to move over said record, a stop for controlling the movement of said record, and a stop-controlling member, of means for positively actuating said stop-controlling member, mechanism for operating said actuating means, and means connected to said sound-reproducing device for controlling said operating means.

13. In a talking machine, the combination with a movable record, a sound-reproducing device adapted to move over said record, a stop for controlling the movement of said record, and a stop-controlling member, of a movable bar operatively connected to said stop-controlling member and adapted to be actuated simultaneously with said sound-reproducing device as the latter moves toward the end of the record, and means controlled by the movement of said sound-reproducing device for controlling the movement of said bar.

14. In a talking machine, the combination with a movable record, an arm movably supported above said record, a sound-reproducing device carried by said arm and adapted to move over said record, a stop for controlling the movement of said record, and a stop-controlling member, of means movably mounted on a fixed part of said machine for automatically actuating said stop-controlling member, and a finger carried by said arm for controlling the movement of said actuating member.

15. In a talking machine the combination with a rotatable record support, a sound record, a sound box, and means to move the sound box across the record, of a device operative to stop the rotation of said record support, a latch for holding said device inoperative, a lever movably connected to said latch and adapted to release the same, and means for automatically actuating said lever when the sound box reaches a pre-determined point on the record.

16. In a talking machine, the combination with a movable record support, and a sound box arranged to traverse a record thereon, of a brake, means for applying said brake to said record support, a latch for holding said brake in inoperative position, mechanical means having a jointed connection with the latch and adapted to release the same, and means movable with the sound box for actuating the last-named means when the sound box reaches the end of the record.

17. In a talking machine, the combination with a record support and a sound box adapted to traverse the same, of a brake adapted to engage the record support, two pivoted members operatively connected together at all times and one of which is adapted to engage the brake and forms a latch therefor to hold the same in inoperative position, and means movable with the sound box for engaging the other member to release the brake when the sound box reaches a predetermined point on the record.

18. In a talking machine, the combination with a record support, a movable sound box arm and a sound box carried thereby, of a brake adapted to engage the record support, two pivoted members operatively connected together at all times and one of which is adapted to engage the brake and forms a latch therefor to hold the same in inoperative position, and a finger carried by said sound box arm and adapted to engage said other member to release the brake when the sound box reaches a predetermined point on the record.

19. In a talking machine, including a rotatable record support, and a tone arm mounted to carry a sound box over and in operative relation to the record, the combination therewith of a brake device to stop the movement of the record support, comprising a tripping member mounted to move in accord with the movement of the sound box, a brake, a pivoted latch for holding the brake in inoperative position, and a lever movably connected to the latch and coöperating with the tripping member to release the brake when the sound box reaches a predetermined point on the record.

20. In a talking machine, the combination with a movable sound record support and a sound box arm movable across the same, of brake mechanism for stopping the movement of the record support at a determinate point, said brake mechanism comprising a brake, a catch and coacting pivoted latch for holding the brake in inoperative position, a lever movably connected to the latch and adapted to release the same, and tripping means intermediate said lever and said sound box arm for releasing the latch when the sound box reaches the end of the record.

21. In a talking machine, the combination with a sound box and a record support, of brake mechanism for stopping the movement of the record support at a determinate point, said brake mechanism comprising a brake having a catch, a pivoted latch adapted to engage said catch, a lever movably connected to the latch and adapted to release the same, and means for automatically actuating the lever when the sound box reaches a predetermined point on the record, to move the latch and release the brake.

22. In a talking machine, the combination with a movable sound box arm, a sound box and a record support, of brake mechanism for stopping the movement of the record support at a determinate point, said brake mechanism comprising a brake having a catch, a pivoted latch adapted to engage said catch, a lever movably connected to said latch and adapted to release the same, and a finger movable with said sound box arm and adapted to engage said lever when the sound box reaches a predetermined point on the record, to move said latch and release the brake.

In testimony whereof I have signed my name to this specification.

HENRY C. MILLER.